United States Patent Office 3,179,671
Patented Apr. 20, 1965

3,179,671
NOVEL MITOMYCIN DERIVATIVES
John Halley Mowat, Pearl River, James Burns Patrick, Suffern, Richard Preston Williams, Tomkins Cove, and Donna Bernice Cosulich, Pearl River, N.Y., and John Schurr Webb, Woodcliff Lake, N.J., assignors to American Cyanamid Company, Stamford, Conn., a corporation of Maine
No Drawing. Filed June 7, 1962, Ser. No. 200,667
17 Claims. (Cl. 260—319)

This invention relates to novel antibiotic substances. More specifically, the invention relates to novel antibiotic compounds of the formula:

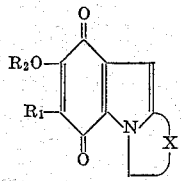

wherein $R_1$ is lower alkyl; $R_2$ is hydrogen, lower alkyl, or lower alkanoyl; $R_3$ is hydrogen, hydroxymethyl, carbamoyloxymethyl, formyl, or lower alkanoyloxymethyl; and X is a divalent radical consisting of

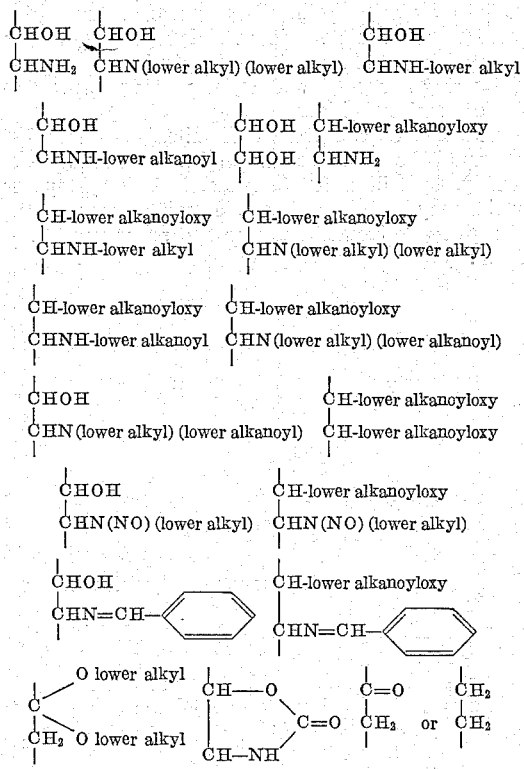

The terms lower alkyl, lower alkanoyl and lower alkanoyloxy are intended to embrace radicals having 1–6 carbon atoms.

The system for numbering the various positions of the rings of the compounds of this invention is indicated as follows:

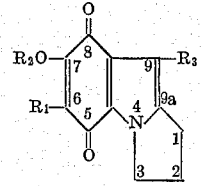

Apo mitmycin A, one of the compound products of this invention is a brightly colored golden orange crystalline solid which is relatively insoluble in such solvents as benzene, toluene, chloroform, diethyl ether, water and ethyl acetate, and relatively more soluble in methanol, dimethylformamide, and the like. This compound is mildly basic and can form acid addition salts.

The novel antibiotic substances of this invention are active in vitro against a variety of standard test microorganisms selected to screen for activity against pathogens. These standard test microorganisms include gram-positive and gram-negative bacteria and fungi.

The novel antibiotic substances of this invention are also active in vivo against standardized infections in mice with *Staphylococcus aureus*, strain Smith, originally isolated from a human patient afflicted with osteomyelitis as described by J. M. Smith and R. J. Dubos in Journ. Expt. Med. 103, 87 (1956). *Staphyloccocus aureus*, strain Smith, is coagulose positive, tellurite negative and is sensitive to tetracycline, penicillin, streptomycin, erythromycin, carbomycin, neomycin, chloramphenicol, and novobiocin in vitro.

Mitomycin A and mitomycin B were first reported by T. Hata et al. in J. Antibiotics Ser. A, IX, No. 4, 141 (July 1956). Mitomycin C was first described by S. Wakaki et al. in Antibiotics and Chemotherapy, VIII, 228 (1958). Porfiromycin has been described by De Boer et al. in P. Gray, B. Taberkin and S. G. Bradley, Antimicrobial Agents Annual 1960, Plenum Press, New York, N.Y., pages 17–22 (1961); R. R. Herr et al., ibid., pages 23–26; C. Lewis et al., ibid., pages 27–36; and L. J. Hanka, ibid., pages 27–39.

Two new classes of antibiotic substances which can be derived from the mitomycins are the subjects of the copending application of Patrick et al., Serial No. 200,632, filed concurrently herewith, now Patent No. 3,140,293, and the copending application of Meyer et al., Serial No. 200,631, also filed concurrently herewith.

We have now discovered still another very extensive class of novel antibiotic substances derivable from the mitomycins. The instant novel antibiotic substances differ most significantly from the above-mentioned groups of antibiotic substances in lacking the fused aziridine ring characteristic of the mitomycins. Lack of this fused aziridine ring puts the antibiotic substances of this invention in an entirely distinct and separate chemical class from the above-mentioned antibiotic substances The many individual members of the novel class of antibiotic substances of this invention may be prepared by a variety of transformation which may be outlined as follows:

In aqueous acid mitomycin A, mitomycin B, N-alkyl and N-acyl derivatives of mitomycin A undergo marked change: the elements of methanol or water are removed forming an unsaturated 9,9a-bond, and the aziridine ring is cleaved to give an hydroxyl function at the 1-position and an amino function at the 2-position, and also (as described hereinbelow) some of the isomeric product in which the hydroxyl function is at the 2-position and the amino function is at the 1-position. The ratio of the two products varies with the strength of the hydrolyzing acid.

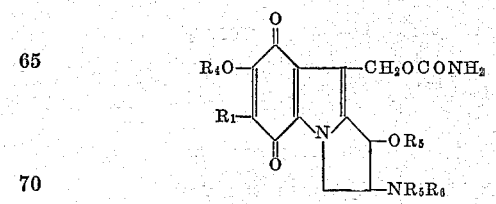

wherein $R_1$ and $R_4$ are lower alkyl; $R_5$ is hydrogen, lower alkyl, or lower alkanoyl; and $R_6$ is hydrogen or lower alkyl. These compounds may be designated apo mitomycins (and the isomeric forms, iso apo mitomycins). Examples 1, 2, 3, and 12, below, illustrate preparation of apo mitomycins; Example 52, below, illustrates preparation of an iso apo mitomycin.

The hydroxy function and the amino function are readily acylated, so that the apo mitomycins and the iso apo mitomycins may be converted into N,O-diacyl apo mitomycins and N,O-diacyl iso apo mitomycins respectively by means of conventional acylating reagents and conditions.

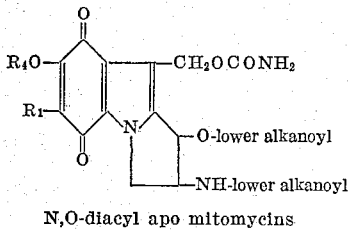

N,O-diacyl apo mitomycins

Examples 6A and 7A below, show acylation of apomitomycins to yield N,O-diacyl apo mitomycins.

When a mitomycin is exposed successively to acid and then alkaline hydrolyzing conditions, the 9,9a double bond is formed and the aziridine ring is cleaved, and in addition hydrolysis occurs at the 7-position, thereby yielding an apo mitomycin having a free hydroxy function at the 7-position. This series of compounds may be designated indicator quinone mitomycins in view of their indicator characteristic. When mitomycin C or porfiromycn is the starting compound, the 7-amino group is replaced by hydroxyl, so that these starting materials yield members of the same indicator quinone mitomycin series.

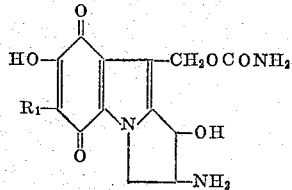

Indicator quinone mitomycins

Illustrations of such hydrolytic preparation of indicator quinone mitomycins are given below as Examples 4, 5, 19, 20, and 21.

Alternately an apo mitomycin may be converted into an indicator quinone mitomycin by alkaline hydrolysis. Such a conversion, of course, represents merely the second step of the overall conversion of a mitomycin into an indicator quinone mitomycin with isolation of the intermediate apo mitomycin. An illustration of conversion of an apo mitomycin into an indicator quinone mitomycin is Example 18, below.

The indicator quinone mitomycins may be acylated (as may the apo mitomycins, as indicated hereinabove) by conventional methods.

When appropriate indicator quinone mitomycins are fully acylated, acylation occurs at the 1, 2, and 7 positions, so that the products are triacyl indicator quinone mitomycins. Illustrations of preparation of triacyl indicator quinone mitomycins are Examples 8, 9, 22, and 23, below.

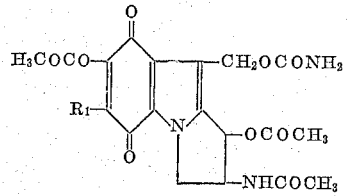

Triacyl indicator quinone mitomycins

The 7-acyl functions of triacyl indicator quinone mitomycins may be preferentially deacylated by means of mild hydrolyzing conditions to give N,O-diacyl indicator quinone mitomycins.

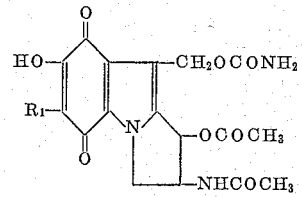

N,O-diacyl indicator quinone mitomycins

Illustrations of preferential deacylation of triacyl indicator quinone mitomycins to yield N,O-diacyl indicator quinone mitomycins are given below as Examples 10 and 11.

N,O-diacyl indicator quinone mitomycins may be converted into the corresponding 7-lower alkyl ethers by means of appropriate alkylating agents. These products are N,O-diacylated apo mitomycins and can be shown to be the same compounds as those produced by acylating apo mitomycins. Thus N,O-diacylated apo mitomycins may be prepared by acylating apo mitomycins (Examples 6A and 7A, below) and by alkylation of N,O-diacyl indicator quinone mitomycins (Examples 6B and 7B, below).

N,O-diacyl apo mitomycins may also be produced by a third route, that is by simultaneous acid hydrolysis and acylation of a mitomycin. Thus, when a mitomycin is exposed to appropriate acid conditions in the presence of an acylating agent, the 9,9a-double bond forms, the aziridine ring is opened, and acylation occurs at the then acylable 1 and 2 positions.

Illustrations of conversions of mitomycins into N,O-diacyl apo mitomycins are Examples 13 and 14, below.

Finally, by still a fourth route, N,O-diacyl apo mitomycins may be produced by acid acylation of a member of the group designated anhydro apo mitomycins of the formula:

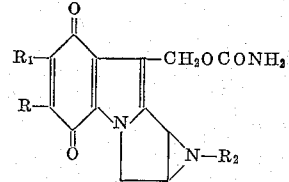

wherein R is lower alkyl; $R_1$ is methoxy or amino; and $R_2$ is hydrogen or methyl, and which forms the subject matter of the copending application of Patrick et al., Serial No. 200,632, filed concurrently herewith, now Patent No. 3,140,293.

Example 15, below, illustrates the conversion of an anhydro apo mitomycin of the copending application of Patrick et al., Serial No. 200,632, now Patent No. 3,140,294, into an N,O-diacyl apo mitomycin.

Somewhat more vigorous hydrolysis of appropriate mitomycins or compounds derivable from mitomycins results in removal of the carbamoyl group at the 9-position, as well as the hydrolyzing results already outlined above. Thus indicator quinone mitomycins may be converted into decarbamoyl indicator quinone mitomycins by treatment with strong acid (Examples 25 and 26, below):

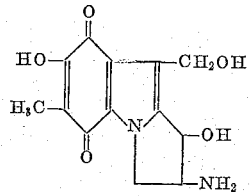

A decarbamoyl indicator quinone mitomycin

Similarly, mitomycin A on treatment with strong acid is converted directly into decarbamoyl indicator quinone mitomycin A (Example 24, below).

As is true of other mitomycin derivatives, the mitomycins of the decarbamoyl indicator quinone series may be acylated. Full acylation yields a tetraacyl decarbamoyl indicator quinone (Examples 27 and 29, below). Mild hydrolyzing conditions may then preferentially deacylate a tetraacyl decarbamoyl indicator quinone mitomycin at the 7-position, yielding a triacyl decarbamoyl indicator quinone mitomycin (Example 28, below):

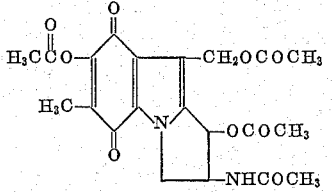

A tetraacyl decarbamoyl indicator quinone mitomycin

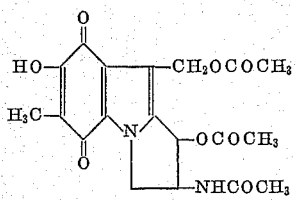

A triacyl decarbamoyl indicator quinone mitomycin

When an apo mitomycin is treated with aqueous nitrous acid, replacement of the 2-amino function with hydroxyl may occur, yielding an oxydesamino apo mitomycin (Examples 31 and 32, below).

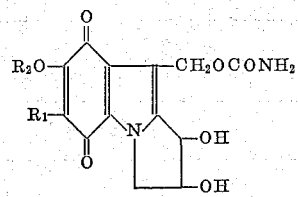

Oxydesamino apo mitomycins

An oxydesamino apo mitomycin may be acylated to yield a diacyl oxydesamino apo mitomycin (Example 33, below) or may be decarbamoylated to yield a decarbamoyl oxydesamino apo mitomycin (Examples 34 and 35, below). And a decarbamoyl oxydesamino apo mitomycin may be acylated to give a triacyl decarbamoyl oxydesamino apo mitomycin (Example 36, below).

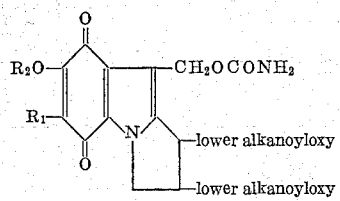

Diacyl oxydesamino apo mitomycins

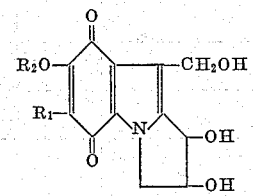

Decarbamoyl oxydesamino apo mitomycins

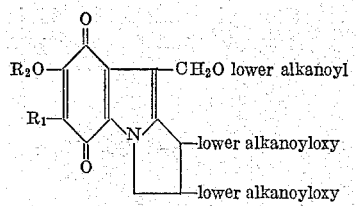

Triacyl decarbamoyl oxydesamino apo mitomycins

Alternately, or perhaps concurrently—when an apo mitomycin is treated with aqueous nitrous acid—removal of the elements of ammonia may occur to yield a desammono apo mitomycin (Example 37, below). Simultaneously decarbamoylation may occur yielding a decarbamoyl desammono apo mitomycin (Example 38, below).

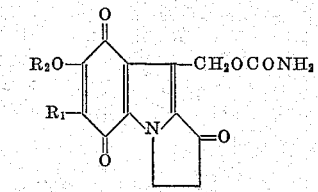

Desammono apo mitomycins

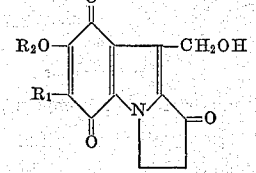

Decarbamoyl desammono apo mitomycins

The apo mitomycins may be reacted with numerous other conventional reagents to yield conventional derivatives:

Treatment with a nitrosating agent may yield an $N^2$-nitroso derivative (Example 30, below).

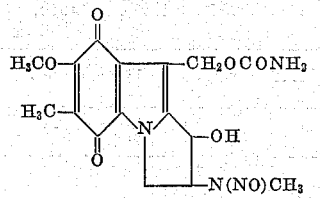

An $N^2$-nitroso derivative of an apo mitomycin

Treatment with an aromatic aldehyde may yield a Schiff's base (Example 43, below):

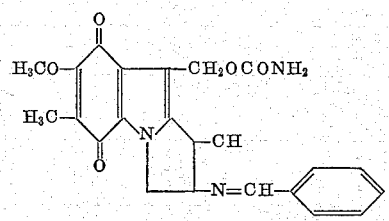

N-benzylidene apo mitomycin A

Treatment with a condensing agent such as phosgene, thiophosgene, or the like may yield a derivative having a heterocyclic ring fused to the 1,2-positions. Such a condensation is illustrated by Example 45, below:

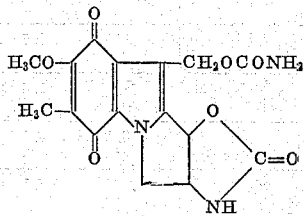

Derivative obtained by reacting apo mitomycin A with phosgene

Treatment of mitomycins with Lewis acids in anhydrous lower alcohols yields an apo mitomycin lower alkyl ether (Example 46, below):

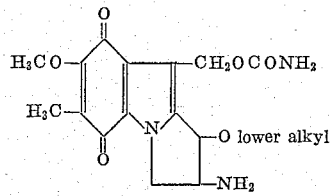

Apo mitomycin a lower alkyl ether

Concurrently with formation of an N-acylated apo mitomycin when an N-acylated mitomycin is exposed to aqueous acid, there may also be formed some of the O-acylated mitomycin, as when N-acetyl mitomycin A may be shown on treatment with aqueous acid to yield not only N-acetyl apo mitomycin A (Example 3, below), but also some O-monoacetyl apo mitomycin A:

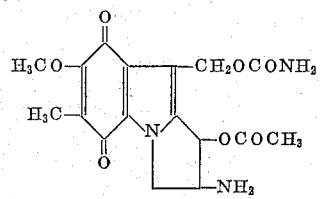

O-monoacetyl apo mitomycin A

By still another alternative, as indicated hereinabove, when a mitomycin is treated with aqueous acid, the aziridine ring may be cleaved so as to yield, not an apo mitomycin, but an iso-apo mitomycin, with the hydroxyl and amino groups reversed in positions. Formation of an iso-apo mitomycin is illustrated by Example 52, below, which describes the preparation of iso-apo mitomycin A:

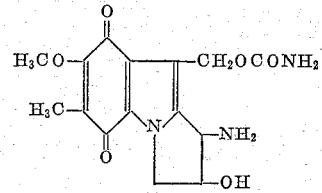

Iso apo mitomycin A

The iso apo mitomycins, as expected, give rise to iso series corresponding to each of the other groups described hereinabove, such as an iso indicator quinone mitomycin series, iso decarbamoyl indicator quinone mitomycins, iso desammono apo mitomycins, etc.

As indicated, the novel antibiotic substances of this invention are useful antimicrobial agents and have broad-spectrum antimicrobial activity in vitro against standard laboratory microorganisms used to screen for activity against pathogens. The antimicrobial spectra of typical antibiotic products of this invention, indicated by the amounts required to inhibit growth of the test microorganisms, were determined in standard manner by the agar-dilution streak-plate techniques commonly used in testing new antibiotics. The minimal inhibitory concentrations, expressed in micrograms per milliliter of new antibiotic substance, are reported in the table below. For the purpose of providing comparisons the spectrum of mitomycin A is also included.

ANTIFUNGAL AND ANTIBACTERIAL ACTIVITY MINIMAL INHIBITORY CONCENTRATIONS IN mcg. PER ml.

| Product | Ex. No. | Fungi | | | | | | | | | | |
|---|---|---|---|---|---|---|---|---|---|---|---|---|
| | | Myco. 607 | Staph. 209 P | Sarc. 1001 | Subt. 6633 | Faec. 8043 | Strep. C 203 | Strep. 41 | γ Strep. 11 | Staph. 69 | β Strep. 80 | Cereus 5 |
| Apo mitomycin A | 1 | 12.5 / 12.5 | 3.1 / 3.1 | 6.2 | 1.5 / 3.1 | 3.1 / 3.1 | 0.4 | 0.2 | 3.1 | 3.1 | 6.2 | 1.5 |
| Diacetyl apo mitomycin A. | 6 | >25 | 12.5 | 12.5 | 6.2 | 12.5 | 0.8 | 0.8 | 25 | 12.5 | 25 | 12.5 |
| Diacetyl apo mitomycin B. | 7 | 25 | 3.1 | 12.5 | 3.1 | 12.5 | 0.4 | 0.2 | 12.5 | 3.1 | 12.5 | 3.1 |
| Iso apo mitomycin A | 52 | 12.5 | 6.2 / 12.5 | 12.5 | 6.2 / 3.1 | 6.2 / 12.5 | 0.8 | 0.8 | 12.5 | 12.5 | 12.5 | 6.2 |
| Desammono apo mitomycin A. | 37 | >10 / >50 | >10 / 50 | >10 | 10 / 12.5 | >10 / >50 | 5 | 5 | >10 | >10 | >10 | >10 |
| Oxydesamino apo mitomycin A. | 31 | >50 | 6.2 | 6.2 | 6.2 | 12.5 | 0.8 | 0.8 | 6.2 | 6.2 | 6.2 | 3.1 |
| Decarbamoyl oxydesamino apo mitomycin A. | 34 | >50 | >50 | >50 | >50 | >50 | >50 | 50 | >50 | >50 | >50 | >50 |
| Triacetyl decarbamoyl apo mitomycin A. | 17 | 50 / >50 | 0.8 / 1.5 | 6.2 | 0.2 / {0.4P / 1.5} | 1.5P / 12.5 | | 0.1 | 12.5 | 0.8 | {3.1P / 12.5} | 0.4 |
| Triacetyl decarbamoyl oxydesamino apo mitomycin A. | 36 | 3.1 | >25 | | 3.1 | >25 | | | | | | |
| Diacetyl oxydesamino apo mitomycin A. | 33 | 25 | 6.2 | | 0.4 | 25 | | | | | | |
| Diacetyl oxydesamino apo mitomycin A. | 33 | >50 | 3.1 | | 0.2 | 12.5 | | | | | | |
| N-nitroso apo mitomycin B. | 30 | >50 | 1.5 | | 0.4 | 3.1 | | | | | | |
| N-nitroso apo mitomycin B. | 30 | >50 | 1.5 | | 0.8 | 6.2 | | | | | | |
| N-benzylidine apo mitomycin A. | 43 | 3.1 | 3.1 | | 1.5 | 3.1 | | | | | | |
| Apo mitomycin A methyl ether. | 46 | >25 | 3.1 | | 0.8 | 3.1 | | | | | | |

See footnotes at end of table.

ANTIFUNGAL AND ANTIBACTERIAL ACTIVITY MINIMAL INHIBITORY CONCENTRATIONS IN mcg. PER ml.—Continued

| Product | Ex. No. | Kleb. 8 | Alcal. 11 | Coryn. 46 | Sal. gall. | E. coli 22 | Kleb. 53 | Past mult 51 | Prot. 9484 | E. coli 9637 | Staph. Smith |
|---|---|---|---|---|---|---|---|---|---|---|---|
| Apo Mitomycin A | 1 | 3.1 | 3.1 | 3.1 | 25 50 | 12.5 | 12.5 | 3.1 | 1.5 | >50 | 1.5 |
| Diacetyl apo mitomycin A | 6 | >25 | >25 | 6.2 | >25 | >25 | >25 | 6.2 | | | |
| Diacetyl apo mitomycin B | 7 | 25 | 25 | 6.2 | >25 | >25 | | 3.1 | | | |
| Iso apo mitomycin A | 52 | 12.5 | 12.5 | 6.2 | >50 50 | 12.5 | 12.5 | 12.5 | 3.1 | >50 | |
| Desammono apo mitomycin A | 37 | >10 | >10 | >10 | >10 >50 | >10 | >10 | 10 | 50 | >50 | |
| Oxydesamino apo mitomycin A | 31 | 25 | 25 | 3.1 | >50 | 12.5 | | 6.2 | | | |
| Decarbamoyl oxydesamino apo mitomycin A. | 34 | >50 | >50 | >50 | >50 | >50 | | >50 | | | |
| Triacetyl decarbamoyl apo mitomycin A. | 17 | 25 | 25 | 6.2 | >50 >50 | >50 | 12.5 | 0.8 | 25 | >50 | |
| Triacetyl decarbamoyl Oxydesamino apo mitomycin A. | 36 | | | | >25 | | | | >25 | >25 | |
| Diacetyl oxydesamino apo mitomycin A. | 33 | | | | >50 | | | | 12.5 | >50 | |
| Diacetyl oxydesamino apo mitomycin A. | 33 | | | | >50 | | | | 12.5 | >50 | |
| N-nitroso apo mitomycin B | 30 | | | | >50 | | | | 1.5 | >50 | |
| N-nitroso apo mitomycin B | 30 | | | | >50 | | | | 3.1 | >50 | |
| N-benzylidine apo mitomycin A | 43 | | | | 12.5 | | | | | 25 | |
| Apo mitomycin A methyl ether | 46 | | | | >25 | | | | 3.1 | >25 | |

Myco. 607=*Mycobacterium smegmatis* ATCC 607
Staph. 209P=*Staphylococcus aureus* ATCC 6548P
Sarc. 1001=*Sarcina lutea* PCI 1001; ATCC 9341
Subt. 6633=*Bacillus subtilis* ATCC 6633
Faec. 8043=*Streptococcus faecalis* ATCC 8043
Strep. C 203=*Streptococcus pyogenes* C 203, β hemolytic Streptococcus, Group A
Strep. 41=*Streptococcus pyogenes* NY 5
γ Strep. 11=β *Streptococcus* II, nonhemolytic Streptococcus
Staph. 69=*Staphylococcus aureus* 69
β Strep. 80=*Streptococcus hemolyticus*, Group D
Cereus 5=*Bacillus cereus* ATCC 10702
Kleb. 8=*Klebsiella pneumoniae* (Friedlanders)

Alcal. 11=*Alcaligenes* sp. ATCC 10153 (Formerly PCI 3)
Coryn. 46=*Corynebacterium xerosis* NRRL B–1397 (Lederle #119)
Sal. gall.=*Salmonella gallinarium*, Led. An. Ind. 604
E. coli 22=*Escherichia coli*
Kleb. 53=*Klebsiella pneumoniae* "A" Strain AD
Past. mult. 51=*Pasteurella multocida* Type I, Strain 310
Prot. 9484=*Proteus vulgaris* ATCC 9484
E. coli 9637=*Escherichia coli* ATCC 9637
Staph. Smith=*Staphylococcus aureus* strain Smith
ATCC stands for American Type Culture Collection.
PCI stands for Penicillin Control and Immunology Dept. of the F.D.A.

As indicated, the novel antibiotic substances of this invention are also active in vivo against standard infections in mice with *Staphylococcus aureus*, strain Smith. Measurements of in vivo activity in mice against standard infections with *Staphylococcus aureus*, strain Smith, are made according to the following procedure: Unit test groups consist of 5 Carworth Farms (CF 1) mice, females. Initial weights of the mice average 18–21 grams per mouse. Infections are produced by intraperitoneal injections of 0.5 milliliter volumes of $10^{-2}$ trypticase soy broth (TSP) dilutions of *Staphylococcus aureus*, strain Smith, containing $14 \pm \times 10^6$ units as determined by plate counts. The compound being tested is administered to the test mice in graded doses. The compound being tested is administered by a single oral tubing dose or a single subcutaneous injection of 0.5 milliliter of aqueous agar containing the dosage amount.

When diacetyl oxydesamino apo mitomycin A, the product of Example 33, below, was administered subcutaneously one-half hour after infection according to the foregoing procedure, one treated mouse out of five which received 64 milligrams per kilogram of body weight survived, and two treated mice out of five which received 16 milligrams per kilogram of body weight survived, in contrast to no survivals out of 20 control mice.

The invention will be described in further detail in conjunction with the following specific examples.

*Example 1*

PREPARATION OF APO MITOMYCIN A 50 milligrams of mitomycin A in 4.0 cc. of 0.1 N hydrochloric acid is left at room temperature 16.5 hours. The solution is neutralized at 0° C. with 0.1 N aqueous sodium hydroxide to give an orange precipitate of the new antibiotic substance weighing, after collection and drying, 36.2 mg.

For further purification, 26.4 mg. of this material was recrystallized from a mixture of 0.94 cc. of dimethylformamide and 0.62 cc. of water to give, after collection and drying 16.7 mg. of glittering golden orange plates.

*Example 2*

PREPARATION OF APO MITOMYCIN B

A suspension of 50 mg. of mitomycin B in 2 cc. of 0.1 N hydrochloric acid was left 16 hours at room temperature. The resulting red solution was brought to pH 8.25 with N sodium hydroxide solution. The precipitate which formed was left overnight at 4° C. then filtered off, washed with water and dried. There was obtained 16 mg. of orange crystals of apo mitomycin B.

*Example 3*

PREPARATION OF N-ACETYL APO MITOMYCIN A 1.0 milligram of N-acetyl mitomycin A was dissolved in about 1 ml. of N/10 hydrochloric acid and aged at room temperature for 3 hours. The solution was neutralized to pH 7.0 with aqueous potassium hydroxide and evaporated to dryness. The residue was extracted into tetrahydrofuran and the product was precipitated by the addition of ether and petroleum ether.

*Example 4*

PREPARATION OF MITOMYCIN A INDICATOR QUINONE

Crude mitomycin C (362 mg.; 77% pure) in 65 ml. of N/10 HCl was stirred at room temperature for 3 hours, then let stand 24 hours. The dark red solution was then filtered and the filtrate was adjusted to pH 5.65 with N sodium hydroxide solution. After 16 hours at 4° C. the suspension was filtered and the precipitate washed with water and diethyleneglycol dimethyl ether to finally give 233.4 mg. of product. For further purification the material may be recrystallized from dimethyl formamide-water.

Example 5

PREPARATION OF MITOMYCIN B INDICATOR QUINONE

Starting with porfiromycin the compound mitomycin B indicator quinone may be prepared by substantially the same process as used to prepare mitomycin A indicator quinone (Example 4).

Example 6

PREPARATION OF DIACETYL APO MITOMYCIN A (A) Direct method: Apo mitomycin A (39.7 mg.) was treated with 0.4 cc. of acetic anhydride and 2 drops of pyridine and the mixture was left at room temperature 3.5 hours. The resulting crystalline mass was thoroughly triturated and washed with ether and then dried to produce 33.4 mg. of diacetyl apo mitomycin A. For further purification the material was recrystallized from acetonitrile to give orange needles, M.P. 244–246.5° C.

(B) Indirect method: Diacetyl mitomycin A indicator quinone (10 mg.) suspended in 0.2 cc. of dimethyl formamide and 0.2 cc. of tetramethoxy methane was heated 75 minutes at 140° C. The solution was evaporated to dryness and the residue chromatographed by the partition method. Evaporation of the main fraction afforded yellow needles, M.P. 235–245° C., undepressed by admixture with diacetyl apo mitomycin A prepared by direct route. The infra red spectra were identical.

Example 7

PREPARATION OF DIACETYL APO MITOMYCIN B

The direct method (Example 7A) starting with apo mitomycin B or the indirect method (Example 7B) starting with diacetyl mitomycin B indicator quinone can be used substantially as described above (Examples 6A and 6B) to prepare diacetyl apo mitomycin B, M.P. 225–230°.

Example 8

PREPARATION OF TRIACETYL MITOMYCIN A INDICATOR QUINONE

Mitomycin A indicator quinone (100 mg.) suspended in 2 cc. of acetic anhydride was treated with 0.5 cc. of pyridine and let stand 2 hours at room temperature. The solution was evaporated in vacuo and the dark semi-crystalline residue was taken up in hot acetone. The cooled acetone solution was filtered and the filtrate was treated with decolorizing charcoal. After another filtration the solution was left 48 hours at 4° C. there was obtained 64 mg. of crystalline product.

Example 9

PREPARATION OF TRIACETYL MITOMYCIN B INDICATOR QUINONE

Starting with mitomycin B indicator quinone triacetyl mitocycin B indicator quinone may be prepared by substantially the process described about (Example 8).

Example 10

PREPARATION OF DIACETYL MITOMYCIN A INDICATOR QUINONE

A solution of 20 mg. of triacetyl mitomycin A indicator quinone in 2 cc. of acetonitrile was treated with 5 cc. of freshly prepared saturated aqueous sodium borate solution. After 40 minutes at room temperature the solution was acidified to pH 1.5 and concentrated in vacuo until crystals formed. After standing an hour at 0° C., the crystals were collected, washed with water, and dried. There was obtained 13 mg. of product. For further purification the crystals were recrystallized from methanol-water.

Example 11

PREPARATION OF DIACETYL MITOMYCIN B INDICATOR QUINONE

Starting with triacetyl mitomycin B indicator quinone, diacetyl mitomycin B indicator quinone may be obtained by substantially the same process described above (Example 10).

Example 12

PREPARATION OF N-ACETYL APO MITOMYCIN A (ALTERNATE PROCEDURE)

A solution of 10 mg. of mitomycin A in 1 cc. of glacial acetic acid was taken to dryness in vacuo after standing 2.5 hours at room temperature. The residue was chromatographed on a partition column to give 6.4 mg. of N-acetyl apo mitomycin A.

Example 13

PREPARATION OF DIACETYL APO MITOMYCIN A

A solution of 10.0 mg. of mitomycin A in 1.0 ml. of acetic anhydride containing 0.1 ml. of glacial acetic was allowed to stand at room temperature for twenty-four hours protected from moisture. The wine red solution was evaporated at reduced pressure without heat to give a red residue. On treatment of the residue with 1 ml. of methanol and filtration 6.3 mg. of orange crystals was obtained, M.P. 235–237° C. Recrystallization of the product from acetonitrile gave a first crop of 1.7 mg. of yellow crystals, M.P. 247–250° C.

Example 14

PREPARATION OF DIACETYL APO MITOMYCIN B FROM MITOMYCIN B

A solution of 10 mg. of mitomycin B in 1.1 ml. of 10% glacial acetic acid in acetic anhydride was allowed to stand for twenty-four hours protected from moisture at 25° C. The orange residue was treated with 0.3 ml. of ethanol to crystallize the product. After filtering, washing with a little ethanol and drying in vacuo 4.2 mg. of yellow crystals, M.P. 222–225° C. was obtained. On recrystallization from ethanol 2.8 mg. of golden yellow needles M.P. 227–230° C. was obtained.

Example 15

PREPARATION OF DIACETYL APO MITOMYCIN B FROM ANHYDRO APO MITOMYCIN B

A solution of 3.3 mg. anhydro apo mitomycin B (described in the copending application of Patrick et al., Serial No. 200,632, filed concurrently herewith, now Patent No. 3,140,293) in 0.33 ml. of 10% glacial acetic acid in acetic anhydride was allowed to stand at 25° C. for twenty-four hours protected from moisture. After removing the solvent in vacuo, treatment with 0.2 ml. of ethanol to crystallize the product, filtration, washing and drying, 1.4 mg. of yellow crystals was obtained, M.P. 229–230° C. (mixed melting point with diacetyl apo mitomycin B prepared from mitomycin B directly showed no depression). The ultra-violet, infra-red and antibacterial spectra are also the same.

Example 16

PREPARATION OF DIACETYL APO MITOMYCIN B

Diacetyl apo mitomycin B was prepared by heating 16 mg. of diacetyl mitomycin B indicator quinone in a mixture of 0.5 ml. of dimethylformamide and 0.5 ml. of tetramethoxymethane at 140° C. for one hour. The solution was concentrated to dryness and the partially crystalline reside was dissolved in a minimum amount of boiling ethyl acetate. On cooling, 8.6 mg. of crystals was obtained. A sample of crude crystals was recrystallized from ethyl acetate giving the pure product with melting point 228–232° C.

Example 17
PREPARATION OF TRIACETYL DECARBAMOYL APO MITOMYCIN A

A solution of 31 mg. of triacetyl decarbamoyl mitomycin A indicator quinone in 5 ml. of tetramethoxy methane was refluxed for one hour. After removing the solvent in vacuo the residual yellow solid was crystallized from 1 ml. of ethanol to give 21.3 mg. of yellow needles of triacetyl decarbamoyl apo mitomycin A, melting point 215–217° C. On concentration a second crop of brown needles melting point 185–201° C. was obtained.

Example 18
PREPARATION OF MITOMYCIN A INDICATOR QUINONE

A mixture of 37.3 mg. of apo mitomycin A, which may also be named 1-hydroxy-2-amino-6-methyl-7-methoxy-9-carbamyloxymethyl-1H-2,3 - dihydropyrrolo[1,2-a]indole-5,8-dione, and 37.3 ml. of 0.1 N potassium hydroxide was stirred for 5½ hours. The resulting blue solution was treated with 2 N hydrochloric acid to adjust to pH 5.51 and taken to a volume of 1.1 ml. in vacuo. The semi-crystalline mixture was digested at 60–70° C. for one hour, cooled for an hour and the purple-brown crystals isolated; weight, 24.3 mg. of crude product which was purified by recrystallization from dimethylsulfoxide and water. It was identical to the mitomycin A indicator quinone, otherwise named 1,7-dihydroxy-2-amino-6-methyl-9 - carbamyloxymethyl-1H - 2,3-dihydropyrrolo[1,2-a]indole-5,8-dione, prepared by other routes (Examples 4A and 19).

Example 19
PREPARATION OF MITOMYCIN A INDICATOR QUINONE

Mitomycin A (4.9 mg.) dissolved in 5 ml. of 0.1 N sodium hydroxide was allowed to stand 90 minutes. The gray-blue solution was adjusted to pH 1.28 with hydrochloric acid and allowed to stand overnight, during which time the color changed from a light plum to brownish-yellow. After adjusting to pH 5.62 with sodium hydroxide solution, cooling, and seeding, purple-brown crystals formed. These were separated by centrifugation, washed with water and ether and dried to give 4.1 mg. of mitomycin A indicator quinone, otherwise named 1,7-dihydroxy-2-amino-6 - methyl-9 - carbamyloxymethyl-1H-2,3-dihydropyrrolo[1,2-a]indole-5,8-dione, identical to that obtained via other methods (Examples 4A and 18).

Example 20
PREPARATION OF MITOMYCIN B INDICATOR QUINONE

Mitomycin B (0.025 g.) was dissolved in 3.75 ml. of 0.1 N hydrochloric acid and allowed to stand at room temperature for twenty-four hours. The solution was then treated with sufficient 1 N potassium hydroxide solution (0.78 ml.) to make the mixture 0.1 N in potassium hydroxide, and the solution was aged for two hours (until the ultraviolet spectrum indicated that the reaction was substantially complete). The mixture was then adjusted to pH 6.3 with 0.42 ml. of 1 N hydrochloric acid. After cooling overnight, the crude crystalline product was collected, washed with water and dried. Wt. 0.0098 g.

The combined product from several preparations (0.029 g.) was dissolved in water at pH 2, clarified, and titrated to pH 4 with 0.2 N potassium hydroxide solution. The crystalline precipitate was collected, washed with water and dried in vacuo. Wt. 0.0184 g. The product was the same as that obtained in Example 21.

Example 21
PREPARATION OF MITOMYCIN B INDICATOR QUINONE

Porfiromycin (0.400 g.) was dissolved in 150 ml. of 0.1 N hydrochloric acid and allowed to stand at room temperature for about thirty hours. The reaction mixture was then neutralized with about 13.5 ml. of 1 N potassium hydroxide solution to a pH of 4.1. After cooling overnight, the crystalline product was collected, washed with water, ethyleneglycol dimethyl ether, and ether, and dried. Wt. 0.3740 g.

Recrystallization may be effected from a dimethylformamide solution by the addition of water. This is the same product as that of Example 20.

Example 22
PREPARATION OF TRIACETYL MITOMYCIN A INDICATOR QUINONE

A suspension of 188 mg. of mitomycin A indicator quinone in 2 ml. of acetic anhydride was treated with 0.5 ml. of pyridine and let stand 30 minutes at room temperature. The resulting light yellow solution was taken to dryness in high vacuum and the residual crystalline yellow powder was taken up in 20–25 ml. of refluxing acetone. Concentration of the boiling acetone solution to 5–10 ml. and overnight cooling produced 123 mg. of crystalline triacetyl mitomycin A indicator quinone (yellow crystals, melting point 241–246° C., melting with darkening and gas evolution). A second crop could be obtained from the mother liquors.

Example 23
PREPARATION OF TRIACETYL MITOMYCIN B INDICATOR QUINONE

A mixture of 25 mg. of dried (78° C., 15 hours in high vacuum) mitomycin B indicator quinone, 2.2 g. of freshly fused sodium acetate and 22 ml. of acetic anhydride was heated on the steam bath for three hours. Then the acetic anhydride was removed in vacuo and the residual orange oil taken up in chloroform after filtering to remove undissolved sodium acetate. The chloroform extracts were washed repeatedly with water and with saturated sodium chloride solution before evaporation in vacuo to give 27.4 mg. of yellow crystals. After recrystallization from hot benzene there was obtained 16.6 mg. of crystals. Melting point 207–209° C. with bubbling.

Example 24
PREPARATION OF DECARBAMOYL MITOMYCIN A INDICATOR QUINONE

A solution of 400 mg. of mitomycin A in 200 ml. of cold 6 N hydrochloric acid was allowed to stand overnight. After clarification the red-brown solution was taken to dryness in vacuo at a bath temperature of 30–45° C. The residue was dissolved in 60 ml. of water and adjusted to pH 6.28 with 1 N potassium hydroxide. After cooling overnight, the purple-brown crystals were centrifuged, washed with ice-cold water and then with copious amounts of ether and dried in vacuo at room temperature overnight. The crystals weighed 263 mg. but on equilibration with the moisture in the air, a 10.45% weight gain resulted. For analysis a sample was recrystallized four times from dimethyl sulfoxide and water.

The product, decarbamoyl mitomycin A indicator quinone, otherwise named 1,7-dihydroxy-2-amino-6-methyl-9-hydroxymethyl-1H-2,3-dihydropyrrolo[1,2-a]indole - 5,8-dione, lost birefringence at 180–190° C. without melting.

Example 25
PREPARATION OF DECARBAMOYL MITOMYCIN A INDICATOR QUINONE

A solution of 5 mg. of mitomycin A indicator quinone, 1,7-dihydroxy-2-amino-6-methyl - 9 - carbamyloxymethyl-1H-2,3-dihydropyrrolo[1,2-a]indole-5,8-dione, in 2.5 ml. of 6 N hydrochloric acid was allowed to stand at room temperature for 24 hours. After concentration to dryness in vacuo the residue was dissolved in 1.5 ml. of water and adjusted to pH 5.1. After cooling overnight the purple-brown crystals were isolated and weighed 4 mg.

This compound was identical with the decarbamoyl mitomycin A indicator quinone, otherwise named 1,7-dihydroxy-2-amino-6-methyl-9-hydroxymethyl-1H - 2,3 - dihydropyrrolo[1,2-a]indole-5,8-dione, prepared in Example 24, above.

Example 26

PREPARATION OF DECARBAMOYL MITOMYCIN B INDICATOR QUINONE FROM MITOMYCIN B INDICATOR QUINONE

A 100 mg. sample of mitomycin B indicator quinone was placed in 20 ml. of 6 N hydrochloric acid and stirred at room temperature for 26 hours. The resulting orange solution was evaporated to dryness without heating and then redissolved in 2.1 ml. of distilled water. The pH was carefully adjusted and maintained at 6.3 with 10 N potassium hydroxide. The product was crystallized at 5° C. for 18 hours, filtered, washed with 1 ml. of cold water, 1 ml. of ethylene glycol dimethyl ether, and then excess ethyl ether. The air dried product weighed 71 mg.

Example 27

PREPARATION OF TETRAACETYL DECARBAMOYL MITOMYCIN A INDICATOR QUINONE FROM DECARBAMOYL MITOMYCIN A INDICATOR QUINONE

A 650 mg. sample of decarbamoyl mitomycin A indicator quinone was dissolved in 13 ml. acetic anhydride containing 3.2 ml. of pyridine and was allowed to react at room temperature for 2 hours. The reaction mixture was then evaporated to dryness without heat and then dissolved in an excess of hot absolute ethanol. The solvent was concentrated by boiling to 17 ml. and then allowed to cool slowly. Crystallization was completed by allowing to stand at 50° C. for 18 hours. The product was then filtered and washed with 5 ml. of cold ethanol. The dried sample weighed 479 mg.

Example 28

PREPARATION OF TRIACETYL DECARBAMOYL MITOMYCIN A INDICATOR QUINONE

To a solution of 77 mg. of tetraacetyl decarbamoyl mitomycin A indicator quinone in 8 ml. of ethanol was added 8 ml. freshly prepared, saturated aqueous borax solution at room temperature. The color of the solution changed rapidly from orange to blue. After twenty minutes the chilled reaction mixture was acidified to pH 1.5 with 2.4 ml. of 1 N hydrochloric acid and extracted six times with 2 ml. portions of chloroform. The solution comprised of the pooled chloroform extracts, after washing with water and drying over anhydrous magnesium sulfate, was evaporated under nitrogen on the steam bath to give crude orange crystals. Recrystallization from 2.5 ml. of ethanol gave a first crop 22.6 mg. of yellow-orange needles, melting point 185–190° C. with bubbling. On dilution with water the mother liquor gave an additional 12 mg. of crystals, melting point 185–189° C.

Example 29

PREPARATION OF TETRAACETYL DECARBAMOYL MITOMYCIN B INDICATOR QUINONE FROM DECARBAMOYL MITOMYCIN B INDICATOR QUINONE

A 40 mg. sample of decarbamoyl mitomycin B indicator quinone was dissolved in 4 ml. of acetic anhydride containing 2 ml. of pyridine and allowed to stand at 20° C. for 18 hours. The reaction mixture was evaporated to dryness without heat, dissolved in excess ethanol, filtered and the filtrate evaporated to 0.4 ml. After standing at 20° C. for 18 hours, the crystals (33.2 mg.) were filtered and washed with ether.

Example 30

PREPARATION OF N-NITROSO APO MITOMYCIN B

A solution of 200 mg. of apo mitomycin B, 1-hydroxy-2-methylamino-6-methyl-7-methoxy-9 - carbamyloxymethyl-1H-2,3-dihydropyrrolo[1,2-a]indole-5,8-dione, in 17.16 ml. of 0.1 N hydrochloric acid was treated cold with 0.686 ml. of 1 N sodium nitrite over a two day period. The crystalline material which separated was filtered, washed with water, dried and weighed 152 mg. After purification by liquid-liquid partition chromatography using heptane-ethyl acetate-methanol-water (60:40:17:4), orange crystals were obtained of N-nitroso apo mitomycin B, 1-hydroxy-2-nitroso-methylamino-6-methyl-7-methoxy-9-carbamyloxymethyl - 1H-2,3 - dihydropyrrolo[1,2-a]indole-5,8-dione.

Example 31

PREPARATION OF OXYDESAMINO APO MITOMYCIN A

The acid filtrate from Example 37 which was treated as described in Example 38 gave a fraction at 3.0 hold back volumes. When this was repartitioned in heptane-ethyl-acetate-methanol-water (60:40:17:4) it yielded orange crystals, M.P. 174.5–180.5° C. of oxydesamino apo mitomycin A, otherwise named 1,2-dihydroxy-6-methyl-7-methoxy-9-carbamyloxymethyl - 1H-2,3 - dihydropyrrolo-[1,2-a]indole-5,8-dione.

Example 32

PREPARATION OF OXYDESAMINO APO MITOMYCIN A

A solution of 184 mg. of iso apo mitomycin A, 1-amino-2-hydroxy-6-methyl-7-methoxy-9-carbamyloxymethyl-1H-2,3-dihydropyrrolo[1,2-a]indole-5,8-dione, in 56.5 ml. of 0.1 N hydrochloric acid was treated cold with excess sodium nitrite over three days and then extracted with ethyl acetate. After removal of ethyl acetate the residue was subjected to liquid-liquid partition chromatography using heptane-ethyl acetate-methanol-water (60:40:17:4) and a fraction was obtained at 6 hold back volumes which was identical to the oxydesamino apo mitomycin A, 1,2-dihydroxy-6-methyl-7-methoxy-9-carbamyloxymethyl-1H-2,3-dihydropyrrolo[1,2-a]indole-5,8-dione, obtained in Example 31.

Example 33

PREPARATION OF DIACETYL OXYDESAMINO APO MITOMYCIN A

A solution of 62.5 mg. of oxydesamino apo mitomycin A, 1,2-dihydroxy-6-methyl-7 - methoxy - 9 - carbamyloxymethyl-1H-2,3-dihydropyrrolo[1,2-a]indole-5,8-dione, in 2.8 ml. of acetic anhydride and 0.7 ml. of pyridine was allowed to stand 24 hours. After concentration to dryness in vacuo, the residue was fractionally precipitated from ethyl acetate and 30–60° C. petroleum ether to give diacetyl oxydesamino apo mitomycin A, 1-2-diacetoxy-6-methyl-7-methoxy-9-carbamyloxymethyl -1H-2,3-dihydropyrrolo[1,2-a]indole-5,8-dione.

Example 34

PREPARATION OF DECARBAMOYL OXYDESAMINO APO MITOMYCIN A

The acid filtrate from Example 37 which was treated as described in Example 38 gave a fraction at 2.6 hold back volumes which when repartitioned in heptane-ethyl acetate-methanol-water (60:40:17:4) yielded orange crystals of decarbamoyl oxydesamino apo mitomycin A, 1,2 - dihydroxy - 6 - methyl - 7 - methoxy - 9 - hydroxymethyl-1H-2,3-dihydropyrrolo[1,2-a]indole-5,8-dione.

Example 35

PREPARATION OF DECARBAMOYL OXYDESAMINO APO MITOMYCIN A

From the liquid-liquid partition column described in Example 32 at 4.3 hold back volumes was obtained decarbamoyl oxydesamino apo mitomycin A, 1,2-dihydroxy-6-methyl - 7 - methoxy - 9 - hydroxymethyl - 1H - 2,3 - dihydropyrrolo[1,2-a]indole-5,8-dione, which was identical with that described in Example 34.

Example 36

PREPARATION OF TRIACETYL DECARBAMOYL OXYDESAMINO APO MITOMYCIN A

A solution of 0.64 mg. of decarbamoyl oxydesamino apo mitomycin A, 1,2-dihydroxy-6-methyl-7-methoxy-9-hydroxymethyl - 1H - 2,3 - dihydropyrrolo[1,2-a]indole-5,8-dione, in 0.2 ml. of acetic anhydride-pyridine (9 to 1) was allowed to stand at room temperature for 16–18 hours and then taken to dryness. The residue was triacetyl decarbamoyl oxydesamino apo mitomycin A, 1,2-diacetoxy - 6 - methyl - 7 - methoxy - 9 - acetoxymethyl - 1H-2,3-dihydropyrrolo[1,2-a]indole-5,8-dione.

*Example 37*

PREPARATION OF DESAMMONO APO MITOMYCIN A

A solution of 124.2 mgs. of apo mitomycin A, 1-hydroxy - 2 - amino - 6 - methyl - 7 - methoxy - 9 - carbamoyloxymethyl - 2,3 - dihydro - 1H - pyrrolo[1,2-a]indole-5,8-dione, in 26.5 ml. of 0.1 N hydrochloric acid was treated cold with 3.12 ml. of 1 N sodium nitrite over a two day period. The orange crystals were filtered and weighed 92.9 mg. For analysis a sample was recrystallized three times from dimethyl sulfoxide and water and once from acetic acid and water. There was no melting point, birefringence being lost above 195° C. These orange crystals were desammono apo mitomycin A, 6-methyl - 7 - methoxy - 9 - carbamyloxymethyl) - 2,3-dihydro-1H-pyrrolo[1,2-a]indole-1,5,8-trione.

*Example 38*

PREPARATION OF DECARBAMOYL DESAMMONO APO MITOMYCIN A

The acid filtrate from Example 37 was extracted with ethyl acetate and the organic layer taken to dryness. The residue was subjected to liquid-liquid partition chromatography using a heptane-ethyl acetate-methanol-water (50:50:17:4) system. Orange crystals of decarbamoyl desammono apo mitomycin A, 6-methyl-7-methoxy-9-hydroxymethyl - 2,3 - dihydro - 1H - pyrrolo[1,2-a]indole-1,5,8-trione, came off at 0.6 hold back volume.

*Example 39*

PREPARATION OF DECARBAMOYL DESAMMONO APO MITOMYCIN A INDICATOR QUINONE

A solution of 40 mgs. of desammono apo mitomycin A, 6 - methyl - 7 - methoxy - 9 - carbamyloxymethyl - 2,3-dihydro-1H-pyrrolo[1,2-a]indole-1,5,8-trione, in 5 ml. of trifluoroacetic acid and 20 ml. of 6 N hydrochloric acid was heated for 24 hours at 55–56° C. and then taken to dryness in vacuo and the residue subjected to liquid-liquid partition chromatography using heptane-ethyl acetate-methanol-water (60:40:15:6). A fraction came off at about 5 hold back volumes which gave yellow-orange crystals with a tendency to turn purple when exposed to the moisture in air, and which lost birefringence from 140° C. to 205° C. but did not melt. This substance was decarbamoyl desammono apo mitomycin A indicator quinone, 6-methyl-7-hydroxy-methyl-2,3-dihydro-1H-pyrrolo[1,2-a]indole-1,5,8-trione and was soluble in methanol, acetone, dimethyl sulfoxide and dimethyl formamide.

*Example 40*

PREPARATION OF DIACETYL DECARBAMOYL DESAMMONO APO MITOMYCIN A INDICATOR QUINONE

A mixture of 42 mgs. of decarbamoyl desammono apo mitomycin A indicator quinone, 6-methyl-7-hydroxy-9-hydroxy - methyl - 2,3 - dihydro - 1H - pyrrolo[1,2-a]indole-1,5,8-trione with 1.2 ml. of acetic anhydride and 0.4 ml. of pyridine was warmed gently and allowed to stand for 24 hours. After taking to dryness in vacuo the residue was extracted with 90–100° C. petroleum ether. The residue, weighing 29 mgs., was recrystallized from acetone and water to give greenish-yellow needles which lost birefringence at 214–233° C. without melting.

*Example 41*

PREPARATION OF DECARBAMOYL DESAMMONO APO MITOMYCIN A METHYL ETHER, DIMETHYL KETAL

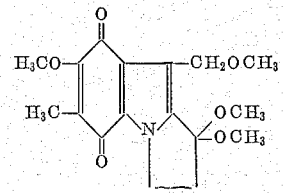

A solution of 10 mgs. of desammono apo mitomycin A, 9 - (carbamoyloxymethyl) - 2,3 - dihydro-7-methoxy-6-methyl-1H-pyrrolo[1,2-a]indole-1,5,8-trione, in 50 ml. of methanol was treated with 5 ml. of trimethyl orthoformate and 1 ml. of fresh 4.8 N methanolic hydrogen chloride at room temperature. After 24 hours 800 mg. of silver oxide was added and the mixture shaken one-half hour to remove hydrogen chloride. The filtrate was evaporated to dryness and purified by liquid-liquid partition chromatography using heptane-methanol-water (100:15:6). Ultraviolet absorption spectra maxima, λ 230, 285, 341, 425 (shoulder) mµ in methanol was of decarbamoyl desammono apo mitomycin A methyl ether dimethyl ketal, 2,3-dihydro-9-methoxymethyl-6-methyl-1,1,7-trimethoxy-1H-pyrrolo[1,2-a]indole-5,8-dione.

*Example 42*

PREPARATION OF DECARBAMOYL DESAMMONO APO MITOMYCIN A, METHYL ETHER

A solution of decarbamoyl desammono apo mitomycin A methyl ether dimethyl ketal, 2,3-dihydro-9-methoxymethyl-6-methyl-1,1,7 - trimethoxy-1H-pyrrolo[1,2-a]indole-5,8-dione, in 0.5 ml. of ethanol was treated with 1 ml. of 0.1 N hydrochloric acid. After one-half hour the solution was extracted with chloroform. The chloroform layer was washed with water and taken to dryness. The ultraviolet absorption spectrum in methanol showed λ 280 mµ and infra-red max. at 5.8µ in KBr. This compound was decarbamoyl desammono apo mitomycin A methyl ether, 2,3-dihydro-7-methoxy-9-methoxymethyl-6-methyl-1H-pyrrolo[1,2-a]indole-1,5,8-dione.

*Example 43*

PREPARATION OF N-BENZYLIDINE APO MITOMYCIN A

Apo mitomycin A (3 mg.) in a solution of 3 mg. of benzaldehyde and 2 cc. of ethanol was refluxed 18 hours and then concentrated to 0.5 cc. On chilling and scratching, the mixture deposited yellow-orange crystals, which after drying, weighed 1.8 mg. and melted at 197–199° C.

*Example 44*

PREPARATION OF O-MONOACETYL APO MITOMYCIN A HYDROCHLORIDE

N-acetyl mitomycin A (2 mg.) in 1 cc. 0.1 N hydrochloric acid was allowed to stand overnight at room temperature. After evaporation of the mixture to dryness in vacuo and through extraction of the residue with chloroform, a chloroform-insoluble residue of O-monoacetyl apo mitomycin A hydrochloride was obtained.

*Example 45*

PREPARATION OF APO MITOMYCIN A PHOSGENE DERIVATIVE

Apo mitomycin A (2.5 mg.) was dissolved with warming in 0.5 ml. of pyridine and after cooling diluted with 0.5 ml. of benzene. About 0.1-0.2 ml. benzene saturated with phosgene was added. An immediate precipitation occurred. The mixture, after being well stirred, was allowed to stand 24 hours. Ice water was then added and the mixture extracted with ethyl acetate and then with butanol. The butanol residue was extracted with chloroform to remove the pyridine hydrochloride.

Example 46

PREPARATION OF APO MITOMYCIN A, METHYL ETHER

Mitomycin A (5.8 mg.) in a carefully dried flask was dissolved in 2 cc. of anhydrous methanol, using a helium sweep and drying tube to exclude moisture. To the resulting solution at 0° C. was added an excess of boron trifluoride etherate while moisture was still carefully excluded; the reaction rapidly turned yellow. After 1-2 minutes the mixture was neutralized by running in ammonia gas, while the temperature was kept down with an ice bath. The reaction mixture was then taken to dryness in vacuo and the residue was redissolved in water, adjusted to pH 7.0 with sodium carbonate, and extracted with chloroform. The chloroform extract, which contained all the yellow color, was dried over magnesium sulfate, filtered and evaporated. The residue was subjected to partition chromatography on Celite (a diatomaceous earth) using a heptane-ethyl-acetate-methanol-water (50:50:15:6) system. From the chromatography was obtained about 2 mg. of material (emerging in the 5-6 holdback volume) of apo mitomycin A methyl ether.

Example 47

PREPARATION OF 6-METHYL-7-HYDROXY-2,3-DIHYDRO-1H-PYRROLO[1,2-a]INDOLE-1,5,8-TRIONE

A solution of 10 mgs. of decarbamoyl desammono apo mitomycin A indicator quinone, 6-methyl-7-hydroxy-9-hydroxymethyl-2,3-dihydro - 1H - pyrrolo[1,2-a]indole-1,5,8-trione in 1 ml. of trifluoroacetic acid and 5 ml. of 6 N hydrochloric acid was heated 24 hours at 55° C. After evaporating to dryness in vacuo the residue was subjected to liquid-liquid partition chromatography using hepane-ethyl acetate-methanol-water (60:40:15:6). A fraction appeared at one hold back volume which gave 2 mgs. of yellow-orange crystals with a tendency to turn purple on exposure to air; this compound was 6-methyl-7-hydroxy-2,3-dihydro-1H-pyrrolo[1,2-a]indole-1,5,8-trione.

Example 48

PREPARATION OF 2,3-DIHYDRO-7-HYDROXY-6-METHYL-1,5,8-TRIOXO-1H-PYRROLO[1,2-a]INDOLE

A solution of 15 mg. of 2,3-dihydro-6-methyl-1,7,8-trioxo-1H-pyrrolo[1,2-a]indole in 150 ml. of methanol was mixed with 1350 ml. of 0.1 N hydrochloric acid solution. The resulting pink solution was kept at 25° C. and its ultraviolet absorption spectrum was determined at intervals. After 10 days it has $\lambda_{max}$ 290 m$\mu$ and it was yellow in color. It was then saturated with salt and extracted with 500 ml. of ether. This extract was dried and concentrated. Crystallization of the residue from acetone afforded 2.8 mg. of 2,3-dihydro-7-hydroxy-6-methyl - 1,5,8 - trioxo - 1H - pyrrolo[1,2-a]indole, yellow needles, M.P. 265° C. dec.:

$\lambda_{max}^{KBr}$ 3.05 (m.), 5.8 (s.), 6.0 (s.), 6.10 (s.)$\mu$; $\lambda_{max}^{CH_3OH}$ 290 m$\mu$ ($\epsilon$=19,000)

violet solution in dilute alkali.

Example 49

PREPARATION OF 6-METHYL-7-ACETOXY-2,3-DIHYDRO-1H-PYRROLO[1,2-a]INDOLE-1,5,8-TRIONE

A solution of 7.5 mgs. of 6-methyl-7-hydroxy-2,3-dihydro-1H-pyrrolo[1,2-a]indole-1,5,8-trione in 0.5 ml. of acetic anhydride and 0.1 ml. of pyridine was allowed to stand 24 hours. After removal of solvents in vacuo, the residue was purified by fractional precipitation from ethanol and heptane to give yellow 6-methyl-7-acetoxy-2,3-dihydro-1H-pyrrolo[1,2-a]indole-1,5,8-trione.

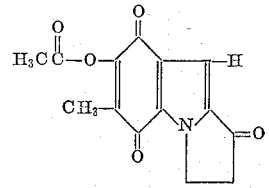

Example 50

To a magnetically stirred suspension containing 300 mg. of 5,7,8-triacetoxy-9-formyl-2,3-dihydro-6-methyl-1H-pyrrolo[1,2-a]indole (described in the co-pending application of Allen et al., Ser. No. 200,649, filed concurrently herewith) in 20 ml. of water, under a nitrogen atmosphere, is added 2.4 ml. of 25% sodium hydroxide. The reaction mixture is heated on the steam bath until solution is essentially complete. Any insoluble material is filtered and for several hours air is bubbled into the filtrate which contains 2,3 - dihydro-9-formyl-6-methyl-5,7,8-trihydroxy-1H-pyrrolo[1,2-a]indole. The solution turns a dark purple. The solution is acidified with 2.4 ml. of unconcentrated hydrochloric acid and is extracted with methylene chloride. The organic phase is washed with saline solution and then dried over sodium sulfate. The solvent is evaporated on the steam bath with addition of petroleum ether (30-60°) to give an orange solid. Recrystallization from methylene chloride-petroleum ether (30-60°) gives orange crystals, M.P. 225-227°;

$\lambda_{max.}^{MeOH}$ 219, 299, 330 m$\mu$; ($\epsilon$=2134; 1445; 810);

$\lambda_{max.}^{KBr}$ 2.95, 5.9, 6, 6.07$\mu$

Example 51

PREPARATION OF ISO APO MITOMYCIN

The mother liquor (pH 7) from the preparation of apo mitomycin A from 1 g. of mitomycin A (Example 1) (recovered apo mitomycin A was 741 mg.; theory was 958 mg., so that approximately 217 mg. should have been in this mother liquor) was evaporated to dryness in the frozen state under high vacuum. The resulting solid was subjected to partition chromatography in a system compound or n-heptane, ethyl acetate and in the ratio 75:100:50. The fraction emerging from the columnmn at the seventh hold back volume was evaporated to give 75 mg. of the residue which was dissolved in hot methanol, filtered and concentrated to 3-4 cc. On chilling yellow crystals of iso apo mitomycin A separated which weighed 41 mg. after collection, washing and drying.

We claim:

1. The process of preparing a compound of the formula:

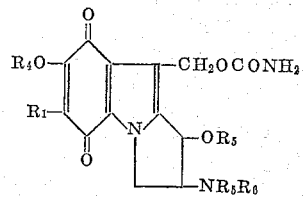

wherein $R_1$ and $R_4$ are lower alkyl; $R_5$ is selected from the group consisting of hydrogen, lower alkyl, and lower alkanoyl; and $R_6$ is selected from the group consisting of hydrogen and lower alkyl, which comprises contacting a compound of the formula:

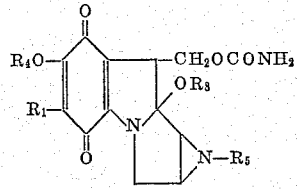

wherein $R_1$, $R_4$, and $R_5$ have the meanings hereinbefore given, and $R_8$ is selected from the group consisting of hydrogen and methyl, with aqueous acid below pH 6.

2. The process of preparing a compound of the formula:

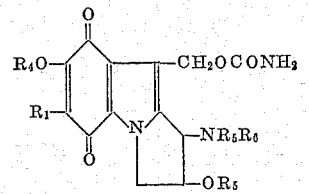

wherein $R_1$ and $R_4$ are lower alkyl; $R_5$ is selected from the group consisting of hydrogen, lower alkyl, and lower alkanoyl; and $R_6$ is selected from the group consisting of hydrogen and lower alkyl, which comprises contacting a compound of the formula:

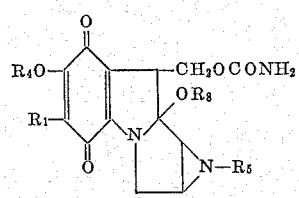

wherein $R_1$, $R_4$, and $R_5$ have the meanings hereinbefore given, and $R_8$ is selected from the group consisting of hydrogen and methyl, with aqueous acid below pH 6.

3. The process of preparing a compound of the formula:

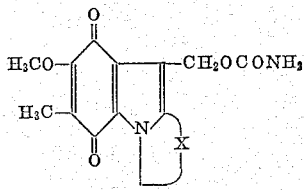

wherein X is selected from the group consisting of

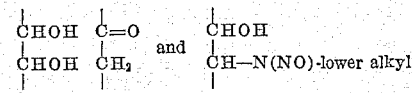

which comprises contacting a compound of the formula:

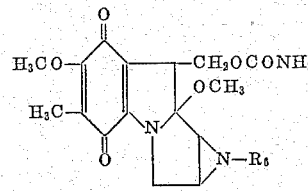

wherein $R_6$ is selected from the group consisting of hydrogen and lower alkyl, with aqueous nitrous acid.

4. A compound of the formula:

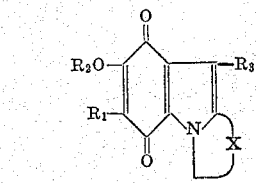

wherein $R_1$ is lower alkyl; $R_2$ is selected from the group consisting of hydrogen, lower alkyl and lower alkanoyl; $R_3$ is selected from the group consisting of hydrogen, formyl, hydroxymethyl, carbamolyoxymethyl and lower alkanoyloxymethyl; and X is a divalent radical selected from the group consisting of

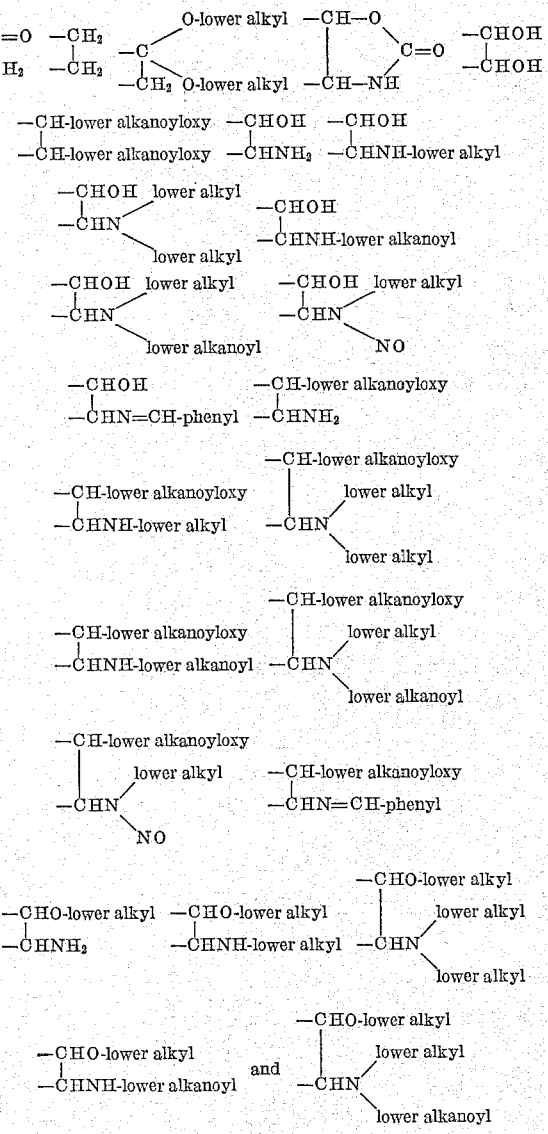

5. The compound of the formula:

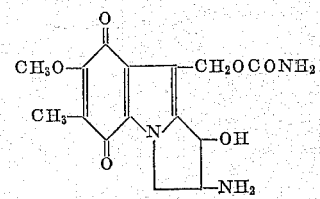

6. The compound of the formula:

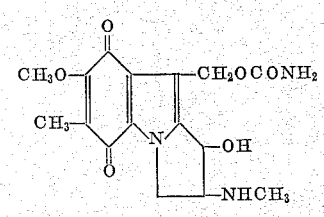

7. The compound of the formula:

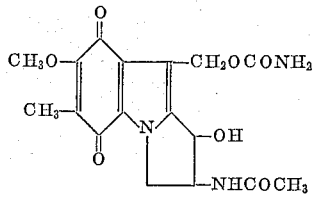

8. The compound of the formula:

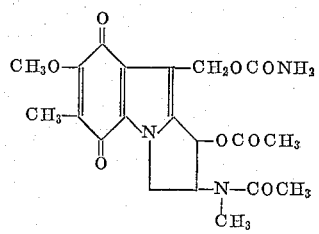

9. The compound of the formula:

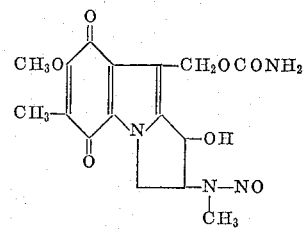

10. The compound of the formula:

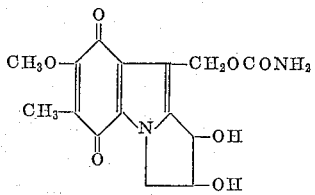

11. The compound of the formula:

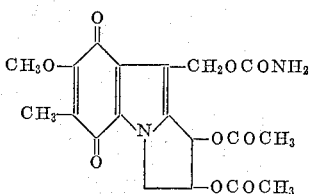

12. The compound of the formula:

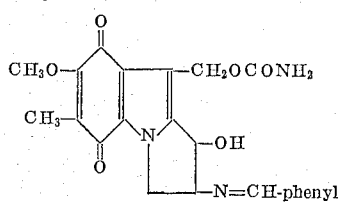

13. The compound of the formula:

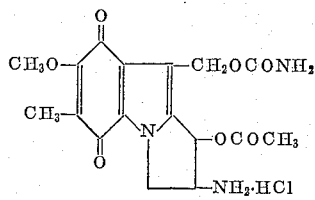

14. The compound of the formula:

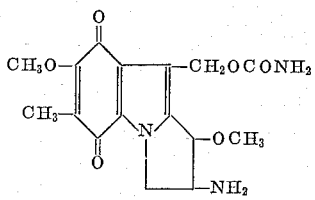

15. The compound of the formula:

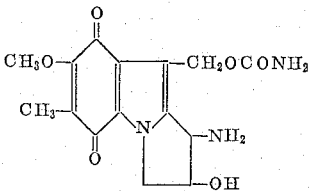

16. The compound of the formula:

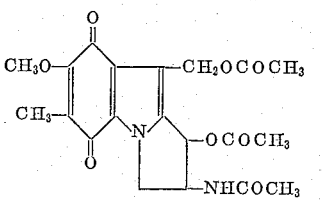

17. The compound of the formula:

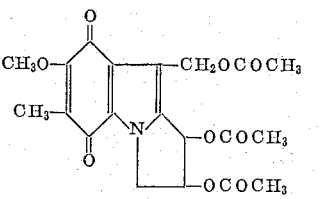

References Cited by the Examiner

Webb et al.: J. American Chem. Soc., vol. 84, pp. 3187–3189 (1962).

IRVING MARCUS, *Primary Examiner.*

NICHOLAS S. RIZZO, WALTER A. MODANCE, *Examiners.*